(12) United States Patent
Yoshida

(10) Patent No.: US 6,825,998 B2
(45) Date of Patent: Nov. 30, 2004

(54) RETAINER

(75) Inventor: Setsuo Yoshida, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/789,275

(22) Filed: Feb. 26, 2004

(65) Prior Publication Data

US 2004/0169940 A1 Sep. 2, 2004

(30) Foreign Application Priority Data

Feb. 26, 2003 (JP) ........................................ 2003-048365

(51) Int. Cl.⁷ ................................................. G02B 7/02
(52) U.S. Cl. ........................ 359/819; 359/811; 359/822
(58) Field of Search ................................. 359/819, 811, 359/822, 823; 403/11, 18, 20, 359.5

(56) References Cited

U.S. PATENT DOCUMENTS 5,589,239 A * 12/1996 Tomono et al. ............... 428/34
6,283,600 B1 * 9/2001 Levasseur ................... 353/119
6,750,947 B1 * 6/2004 Tomita et al. ................ 355/52

* cited by examiner

*Primary Examiner*—Ricky Mack
*Assistant Examiner*—Brandi Thomas
(74) *Attorney, Agent, or Firm*—Morgan & Finnegan LLP

(57) ABSTRACT

A retainer for holding a rotationally symmetrical optical element, includes a retaining member that holds the optical element via three support parts arranged at approximately 120° intervals, and a joint member that joints the optical element with the retaining member, wherein $|(z_b-0.6w_b)-(z_g+1.2)| \leq 1$ is met, where $z_g$ is a coordinate of a gravity center of the optical element, $z_b$ is a coordinate of a center position of a width of said joint member in the z axis direction by which said joint member contacts the optical element, and $w_b$ is the width of said joint member in the z axis direction by which said joint member contacts the optical element.

10 Claims, 15 Drawing Sheets

PRIOR ART

PRIOR ART

PRIOR ART

RETAINER

This application claims a benefit of priority based on Japanese Patent Application No. 2003-048365, filed on Feb. 26, 2003, which is hereby incorporated by reference herein in its entirety as if fully set forth herein.

BACKGROUND OF THE INVENTION

The present invention relates generally to precision machines for mounting a lens, and more particularly to a projection optical system in an exposure apparatus, etc. More specifically, the present invention relates to a retainer that holds an optical element for a more precise imaging relationship in an exposure apparatus in projecting an image on an original sheet, such as a mask or reticle onto an object, such as a single crystal substrate for a semiconductor wafer, a glass plate for a liquid crystal display ("LCD"). The exposure apparatus is used to fabricate a semiconductor device, an image pick-up device (such as a CCD), and a thin film magnetic head.

The fabrication of a device using the lithography technique has employed a projection exposure apparatus that uses a projection optical system to project a circuit pattern formed on a mask onto a wafer and the like, thereby transferring the circuit pattern. The projection optical system enables diffracted beams from the circuit pattern to interfere on the wafer and the like, so as to form an image.

The devices to be mounted on electronic apparatuses should be highly integrated to meet recent demands for miniaturization and low profile of electronic apparatuses, and finer circuit patterns to be transferred or higher resolution have been demanded increasingly. A short wavelength of a light source and an increased numerical aperture ("NA") in a projection optical system are effective to the high resolution as well as a reduced aberration in the projection optical system.

An optical element, such as a lens and a mirror, when deforming in an projection optical system causes aberration because an optical path refracts before and after the deformation and light that is supposed to form an image at one point does not converge on one point. The aberration causes a positional offset and short-circuits a circuit pattern on a wafer. On the other hand, a wider pattern size to prevent short-circuiting is contradictory to a fine process. Therefore, a projection optical system with small aberration should hold its optical element(s) without changing a shape and a position relative to the optical axis of the optical element in the projection optical system so as to maximize the original optical performance of the optical element.

FIG. 12 is a schematic sectional view of a conventional retainer 1000 for holding an optical element 1100. Referring to FIG. 12, the optical element 1100 is engaged with or slightly spaced from an inner circumference of a retaining member 1200 so that one surface of the optical element 1100 contacts a support part 1200a provided on the retaining member 1200. Adhesive 1300 is inserted into an aperture between an outer circumference of the optical element 1100 and the inner circumference of the retaining member 1200. After the adhesive 1300 cures, the optical element 1100 held integrally by the retaining member 1200. The optical element 1100 thus held by the retainer 1000 can constitute an optical system held by a housing 2000 with other optical elements 1100 similarly held by the retainer 1000. FIG. 13 is a schematic sectional view of an optical system including the optical elements 1100 held by the conventional retainer 1000.

In general, the support part 1200a in the retaining member 1200, which contacts the optical element 1100 in a range of 360° around a rotational center axis of the optical element 1100, as shown in FIG. 14. However, the mechanical processing has a difficulty in maintaining the support part 1200a to be completely flat, and the optical element 1100 contacts the retaining member 1200 at plural points from the microscopic viewpoint irrespective of a design of contact in a range of 360°. Subject to the gravity influence in this state, the optical element 1100 undulates by its own weight around contact points as vertices. In particular, a projection lens tends to have a larger caliber and a larger lens capacity due to the recent high NA in the projection optical system, and easily deforms by its own weight. Here, FIG. 14 is a schematic structure of the retaining member 1200 of the conventional retainer 1000.

The projection optical system corrects aberrations that result from various errors in plural optical elements, such as a mirror and a lens, by adjusting a combination of these optical elements and a positional relationship among them, and should consider nanometer deformations about a surface shape of the optical element. However, use of the retainer 1000 would change contact points between the used optical element 1100 and the retaining member 1200 according to a combination between them, and thus vary deformed surface shapes. Therefore, aberrations scatter among retainers that hold different optical elements, and corrections of the aberrations become very arduous.

A retaining member 1500 can be used, as shown in FIG. 15, which arranges three support parts 1500a at 120° intervals around the rotational center of the optical element 1100. The optical element 1100 always contacts and is supported by three support parts 1500a arranged at 120° intervals, is subject to the gravity force, and undulates around contact points (or these support parts 1500a) as vertices that are arranged at 120° intervals. Here, FIG. 15 is a schematic structure of the remaining member 1500 in another conventional retainer.

Since a plane can be geometrically defined by three points, three support parts 1500a always define the same plane irrespective of the processing precision of the retaining member 1500. Therefore, the optical element 1100 that contacts these support parts 1500a is supported under approximately the same condition even when the retaining member 1500 is replaced with another retaining member 1500.

The optical element that undulates around three projections usually generates a trigonometric component of wave front aberration, but this aberration is correctable when the optical element is combined with another optical element in an optical system. This feature reduces scattering aberration among retainers that hold different optical elements, and facilitates an aberrational correction more easily than that for the retaining member 1200 that is configured to contact the optical element in a range of 360° around the rotational center axis of the optical element.

An optical element, such as a mirror and a lens, is often made of an optical glass material, such as quartz, due to excellent optical characteristics and manufacture convenience, whereas a retaining member for the optical element is made of a metallic material for strength and processability. In other words, the optical element and retaining member are made of different materials and have different coefficient of linear expansions. Thus, when the temperatures of the optical element and retaining member vary, for example, as the ambient temperature of the optical system varies and as the optical element heats up, the optical element and the retaining member have different expansion and contraction amounts due to different coefficients of linear expansion.

In the conventional retainers shown in FIGS. 12 to 15, an outer circumference of the optical element and an inner circumference of the retaining member connected to the optical element via the adhesive have different expansion and contraction amounts, and the optical element is subject to a tensile or compressive compulsory displacement in a radial direction and its top and bottom surfaces deform. The optical element consequently changes its optical performance, and the optical system that includes plural optical elements also changes the optical performance. In other words, an optical apparatus deteriorates the optical performance as the temperature varies.

In particular, a retainer that is configured to contact an optical element in a range of 360° around the rotational center axis of the optical element, microscopically contacts the optical element at plural differently positioned points, as discussed, and scatters shape changes of the optical elements as the temperature varies. As a result, it is very difficult to predict aberrational changes and correct the aberration as the temperature varies.

On the other hand, the retainer that is configured to contact an optical element at three points changes a shape of the optical element because a difference in expansion and contraction between the optical element and the retaining member provides a compulsory displacement to the outer circumference of the optical element, but does not displace undulated vertices in the rotational direction so that a size of the projection increases and decreases. Thereby, the trigonometric component of the wave front aberration varies with the temperature due to deformations of the optical element, but it is difficult to correct a variance amount of the trigonometric component as the temperature varies.

BRIEF SUMMARY OF THE INVENTION

Accordingly, it is an exemplified object of the present invention to provide a retainer that restrains changes of trigonometric components generated in an optical element when an ambient temperature changes, and prevents deteriorations of optical performance.

A retainer of another aspect according to the present invention for holding an optical element, the optical element according a center axis of the optical element with a gravity direction, and having an approximately rotationally symmetrical shape includes a retaining member that includes three support parts arranged at approximately 120° intervals around the center axis, and holds the optical element via the support parts, and a joint member that joints the optical element with the retaining member, wherein $|(z_b-0.6w_b)-(z_g+1.2)| \leq 1$ is met, where a Z coordinate system has an origin at an intersection between the center axis and a surface of the optical element, which surface faces a direction opposite to the gravity direction, and sets a Z axis to be positive in the direction opposite to the gravity direction of the center axis, $z_g$ is a coordinate of a gravity center of the optical element in the Z coordinate system, $z_b$ is a coordinate of a center position of a width of said joint member in the z axis direction by which said joint member contacts the optical element in the Z coordinate system, and $w_b$ is the width of said joint member in the z axis direction by which said joint member contacts the optical element.

The optical element is, for example, a mirror. The joint member may be an adhesive or a comb-shaped spring. The retaining member may have an annular shape around the center axis of the optical member. The joint member may joints the retaining member around an entire outer peripheral of the optical element.

An optical system of another aspect according to the present invention includes an optical element that accords a center axis with a gravity direction, and has an approximately rotationally symmetrical shape, and the above retainer. An optical apparatus of still another aspect according to the present invention may include plural optical elements, and the above retainer for holding at least one of said optical elements.

An exposure apparatus of another aspect according to the present invention includes the above retainer, and an optical system for exposing a pattern formed on a mask or reticle onto an object via the optical element held by the retainer.

A device fabrication method of another aspect of the present invention includes the steps of exposing a pattern on a mask, onto an object by using the above exposure apparatus, and developing the exposed object. Claims for the device fabrication method that exhibits operations similar to those of the above exposure apparatus cover devices as their intermediate products and finished products. Moreover, such devices include semiconductor chips such as LSIs and VLSIs, CCDs, LCDs, magnetic sensors, thin-film magnetic heads, etc.

Other objects and further features of the present invention will become readily apparent from the following description of the embodiments with reference to accompanying drawings.

DETAILED DESCRIPTION OF THE PREFERRED EMBODIMENTS

Figure 1:
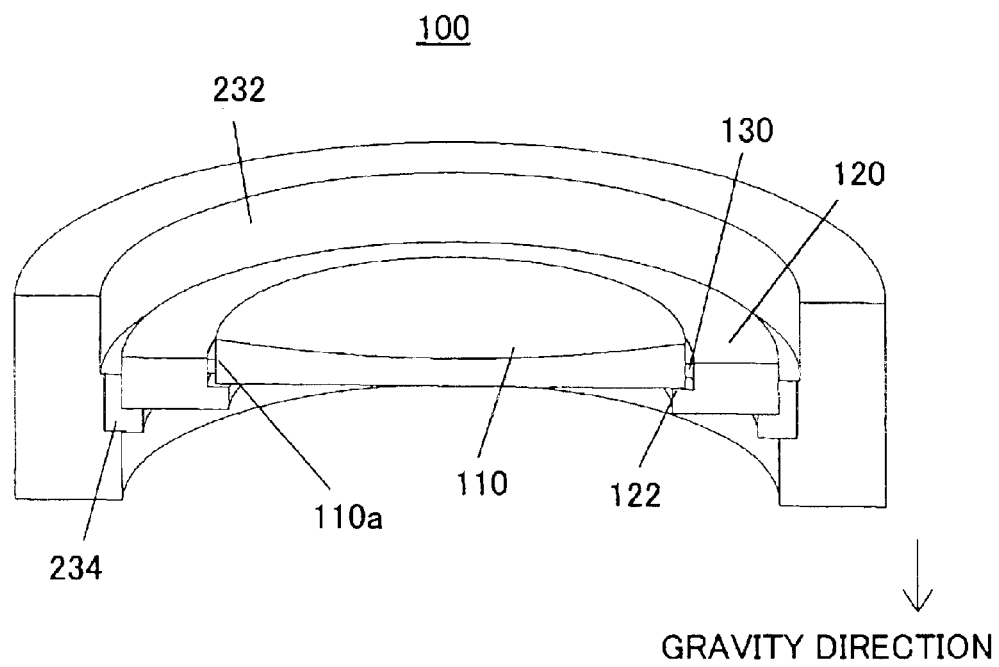
FIG. 1 is a schematic structure of a retainer of one aspect according to the present invention.

Referring now to accompanying drawings, a description will be given of an illustrative retainer 100 and exposure apparatus 200 of the present invention. The present invention is not limited to these embodiments, and each element may be replaced within a scope of the present invention. For example, although the retainer 100 is applied to a projection optical system 230 in the exposure apparatus 200 in the instant embodiment, it is applicable to an illumination optical system 214 in the exposure apparatus 200 and other known optical systems. FIG. 1 is a schematic sectional view of the retainer 100. The gravity direction accords with an optical axis of the optical element 110, as shown in an arrow direction in FIG. 1.

When the optical axis of the optical element is parallel to the gravity direction, the gravity deformation of the optical element becomes the largest and the gravity deformation often affects the optical performance. Therefore, the instant embodiment applies the present invention to a case where the optical axis of the optical element 110 is parallel to the gravity and anti-gravity directions. Like elements in respective figures are designated by the same reference numerals, and a description thereof will be omitted.

In FIG. 1, 100 denotes the retainer 100, and 110 denotes the optical element that has a rotationally symmetrical shape, and an optical axis that accords with the gravity direction. The optical element 110 in the instant embodiment is a mirror arranged so that its mirror surface faces an anti-gravity direction or upstream in FIG. 1. Of course, the optical element 110 is not limited to a mirror, and may include, for example, a lens, a parallel plate glass, a prism, a Fresnel zone plate, a kinoform, a binary optics, a hologram, and other diffraction optical elements.

Figure 2:
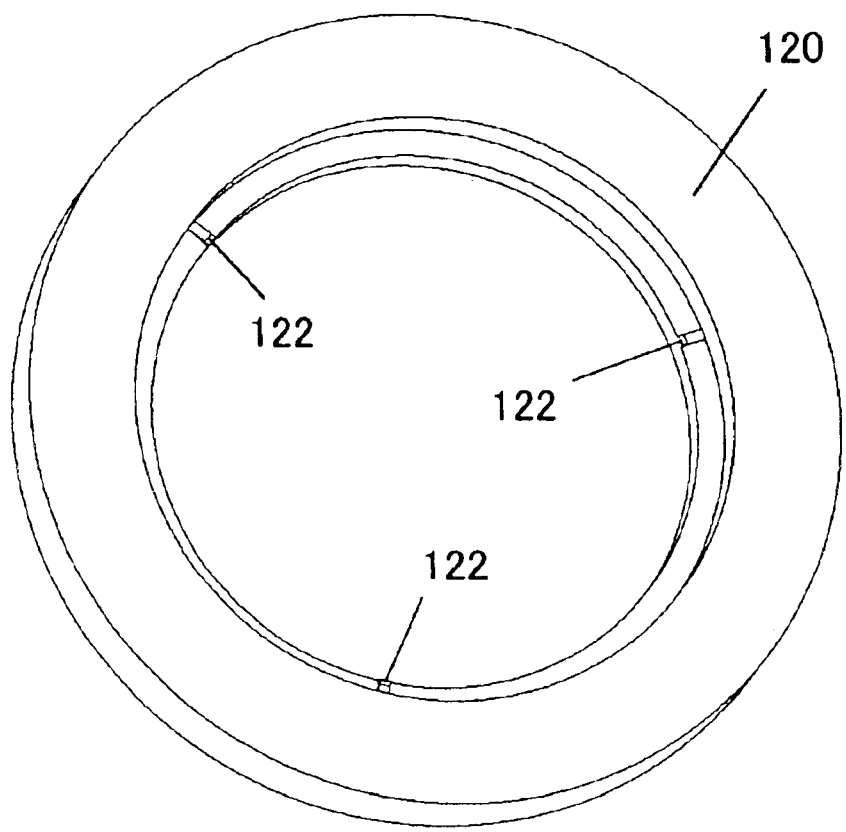
FIG. 2 is a schematic structure of a retaining member shown in FIG. 1.

The retaining member 120 has an annular shape around the center axis of the optical element 110, and holds, as shown in FIG. 2, the optical element 110 via three support parts 122 that are arranged at 120° intervals. Here, FIG. 2 is a schematic structure of the retaining member 120. The retaining member 120 and the support parts 122 are made, for example of materials that have substantially the same coefficient of linear expansion as the material of the optical element. When a difference in coefficient of linear expansion between the optical element 110 and the retaining member 120 would deform or force the optical element 110 by an external force via the support parts 122. On the other hand, the structure of the present invention prevents this problem.

130 denotes a joint member that joints the optical element 110 with the retaining member 120. 232 denotes a mirror barrel of the projection optical system 230 in the exposure apparatus 200, which will be described later. The joint member 130 is an adhesive that minimizes degas in the instant embodiment.

In this structure, the optical element 110 contacts the support parts 122 of the retaining member 120 so that these support parts 122 support a surface that faces the gravity direction and is opposite to the mirror surface. The optical element 1100 is engaged with or slightly spaced from the retaining member 120. The joint member 130 is injected into an entire aperture between the outer circumference of the optical element 110 and the inner circumference of the retaining member 120 (or in a range of 360° around the center axis of the optical element 110). The joint member 130 is the adhesive in the instant embodiment; as the adhesive cures the optical element 110 is held integrally by the retainer 100.

Figure 3:
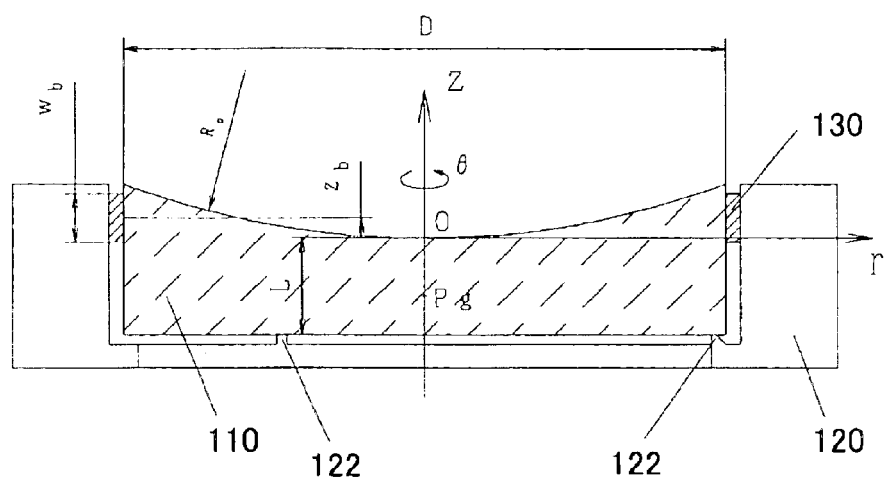
FIG. 3 is a schematic sectional view of a coordinate system of an inventive retainer.

A description will now be given of influence upon the retainer 100 as the ambient temperature varies, by using the infinite-element analysis. As shown in FIG. 3, a cylindrical coordinate system (r, θ, z) is set where the z axis is positive in the anti-gravity direction of the center axis of the optical element 110, an origin O is an intersection between the z axis and a surface at the side of the anti-gravity direction (or a mirror surface), r is a radial direction of the optical element 110 from the origin O, and θ is an angle around the z axis where θ=0 is a direction perpendicular to the z axis and directs to the support part 122. $P_g$ is a gravity center of the optical element 110, and has a coordinate $(0, 0, z_g)$ since the optical element 110 has a rotationally symmetrical shape and the gravity center is located on the center axis. An aperture between the optical element 110 and the retaining member 120, into which the joint member 130 injected, has a width of $w_b$ in the z-axis direction. The optical element 110 has a diameter D, a thickness L on the center axis, and a radius of curvature $R_o$. Here, FIG. 3 is a schematic structure of the coordinate system of the retainer 100.

Figure 4:
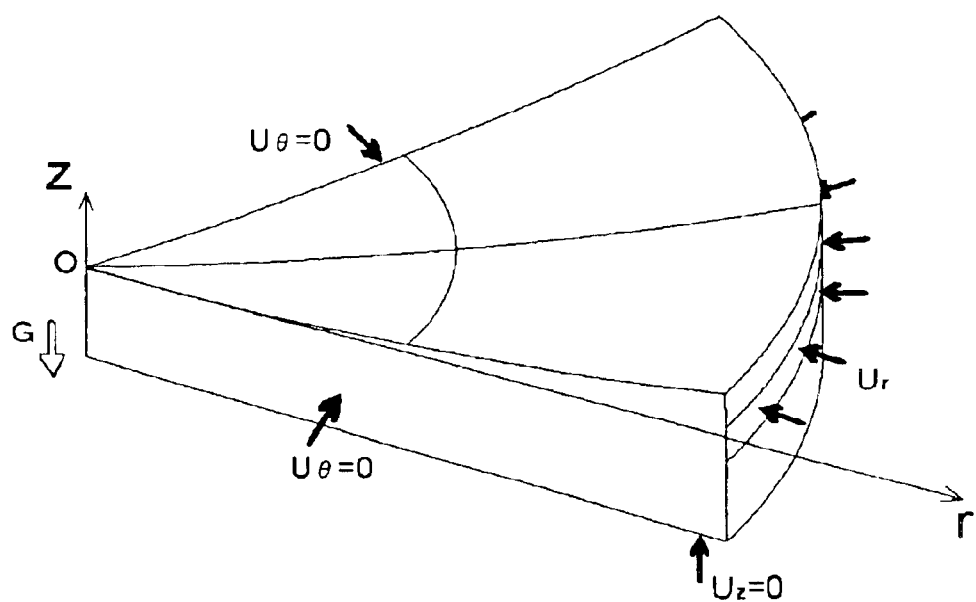
FIG. 4 is a schematic view showing an infinite-element analysis model of the inventive retainer.
Figure 5A:
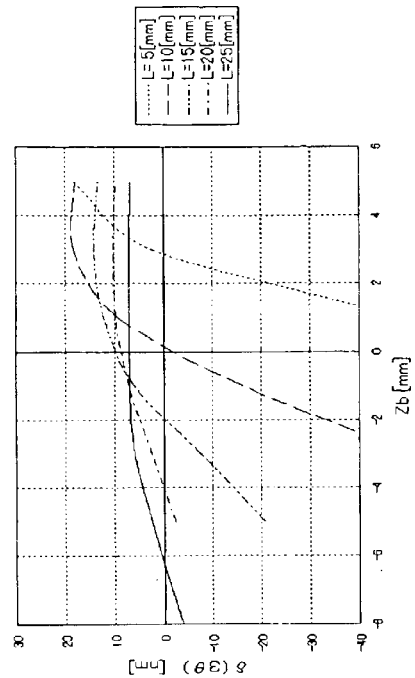
FIG. 5 is a graph showing a relationship between a joint position between an optical element and a retaining member, and 3θ deformation amounts of the optical element in the inventive retainer.
Figure 5B:
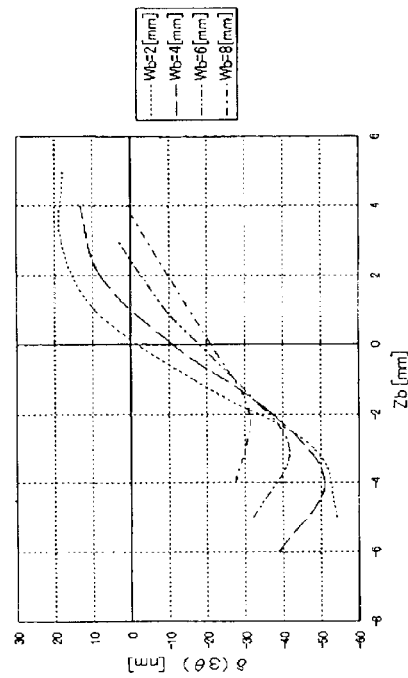
Figure 5C:
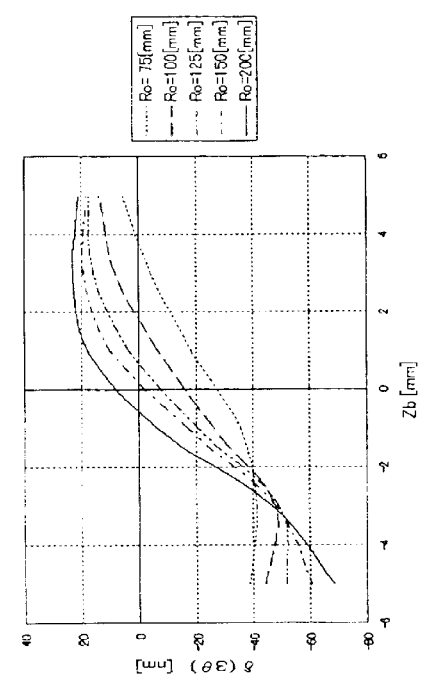
Figure 5D:
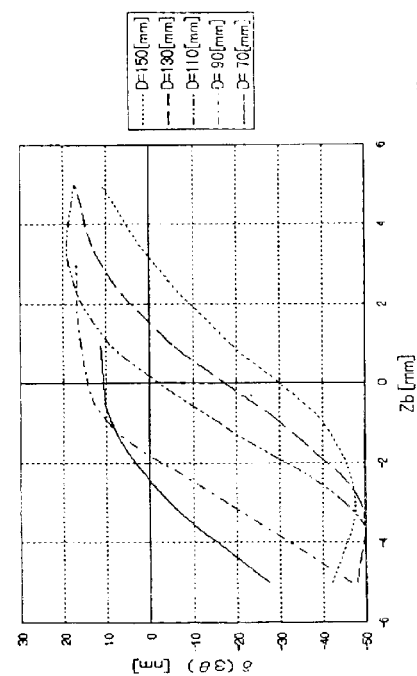

FIG. 4 is an infinite-element analysis model of this retainer 100. The optical element 110 is supported at three points arranged at 120° regular intervals, subject to gravity in the center axis direction, and connected to the joint member 130 around its outer peripheral 110a. When the symmetry of the boundary condition is considered, a range of the infinite-element analysis model to be studied is $0 \leq \theta \leq 60°$. When a displacement at an arbitrary point is expressed as $(U_r, U_\theta, U_z)$ in the cylindrical coordinate system, the boundary condition sets displacement restraints including displacement components $U_\theta=0$ and $U_z=0$ on symmetrical surfaces at θ=0° and θ=60° while a portion of each support parts 122 of the retaining member 120 which contacts the optical element 110 is regarded as a point contact. The gravity acceleration G is set in a negative z-axis direction. A compulsory displacement applied to the optical element 110 due to a difference in expansion and contraction between the optical element 110 and the retaining member 120 as the ambient temperature varies is set to a displacement component $U_r$ in a joint range of the outer peripheral 110a with the joint member 130. Other displacement components are considered unbounded. Here, FIG. 4 is a schematic view of an infinite-element analysis model of the retainer 100.

Referring to FIG. 4, suppose that the optical element 110 is made of quartz (with a modulus of longitudinal elasticity of $7.3 \times 10^{10}$ Pa, a Poisson's ratio of 0.18, and density of $2.2 \times 10^3$ Kg/m$^3$), the gravity acceleration G is set to 9.80665 m/s$^2$, and the boundary condition sets the displacement component $U_r$ to be unbound before the ambient temperature changes, and the displacement component $U_r$ to be −0.1 mm (compression) when the ambient temperature varies. The infinite-element analysis was conducted for elastostatic changes by independently changing a shape of the optical element 110 with respect to a radius of curvature $R_o$ of 150 mm, a thickness L along the center axis of 10 mm, and a joint width $w_b$ of 0.2 mm.

The displacement component $U_z$ as a deformation of the optical element 110 for each point on a mirror surface obtained from the infinite-element analysis is developed by Zernike polynominal, which is also used for aberration theory etc., with respect to the cylindrical coordinate system (r, θ, z) in FIG. 3. The deformed mirror surface of the optical element 110 undulates with three projections arranged at 120° intervals, and is rotationally symmetrical. Therefore, terms in the calculated Zernike polynominal, which do not include θ, such as a so-called axially symmetrical term and coefficients other than so-called 3θ terms, such as sin3θ and cos3θ, become zero due to orthogonal conditions.

Only the 3θ terms among them affect the above trigonometric component of the wave front aberration, in particular, coefficients of $r^3\sin3\theta$ and $r^3\cos3\theta$ with the lowest order of r are much larger than other coefficients of other terms with a higher order of r among the 3θ terms for an undulation with three projections. A sum of the coefficients of these two terms is called 3θ deformations, and a variance amount of the 3θ deformations as the ambient temperature changes is expressed as δ(3θ).

FIG. 5 indicates the thus-obtained variance amount of the 3θ deformations by setting an abscissa axis to the coordinate $z_b$ of the joint position and an ordinate axis to the variance amount δ(3θ) of the 3θ deformations. FIG. 5 is a graph showing a relationship between a joint position between the optical element 110 and the retaining member 120, and the variance amount of the 3θ deformations of the optical element 110. FIG. 5 shows results of infinite-element analyses based on a shape of the optical element 110, by changing only the radius of curvature $R_o$ in FIG. 5A, by changing only the length L along the center axis in FIG. 5B, by changing only the diameter D in FIG. 5C, and by changing only the joint width $w_b$ in FIG. 5D.

Figure 6:
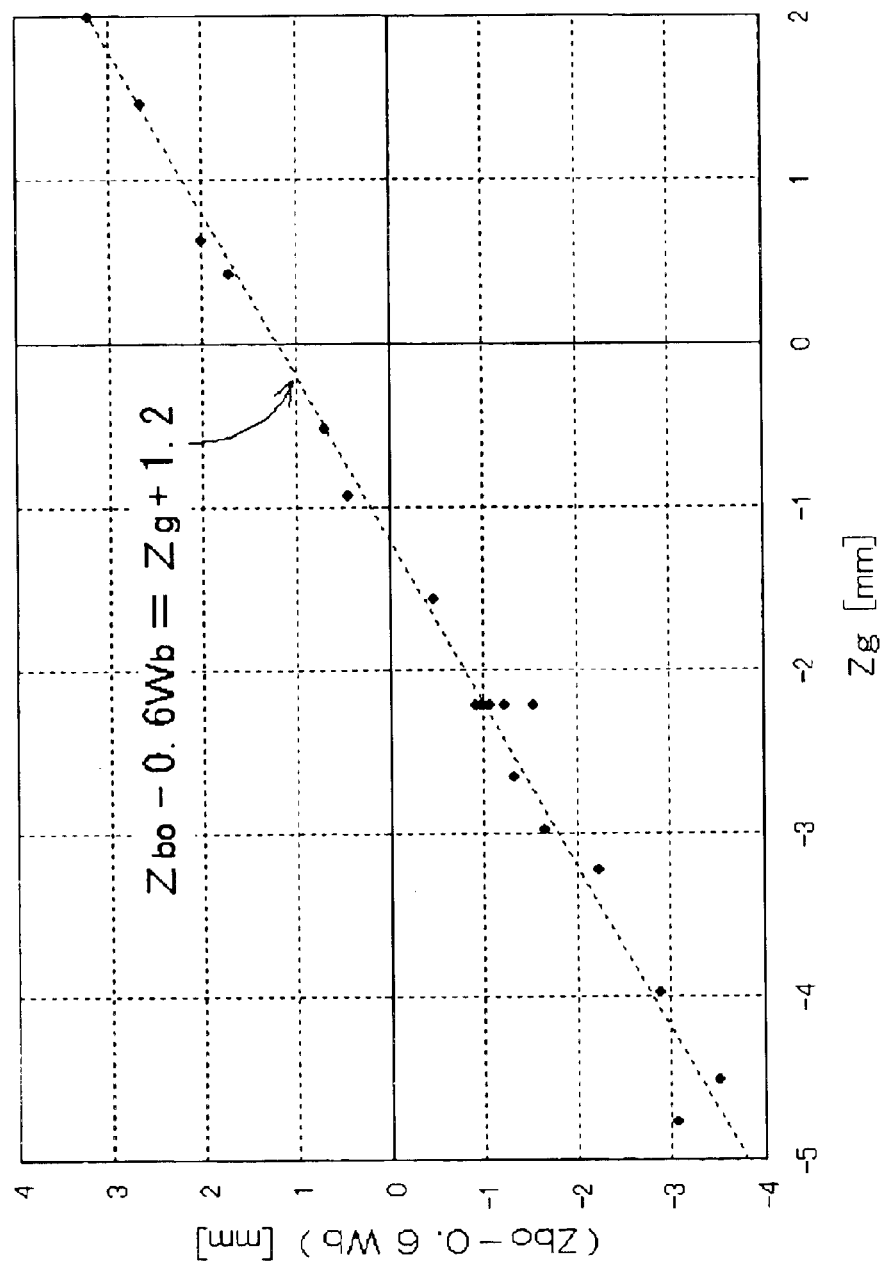
FIG. 6 is a graph showing a relationship between a gravity center position of the optical element and a joint position between an optical element and a retaining member.

From FIGS. 5A to 5D, a coordinate $z_b$ of the joint position always exists which makes zero a variance amount δ(3θ) of the 3θ deformations. In FIGS. 5A to 5D, the infinite-element analysis was conducted-where $Z_{b0}$ is a coordinate $z_b$ of the joint position that makes zero the variance amount δ(3θ) of the 3θ deformation. FIG. 6 shows respective resultant data by setting an abscissa axis to the coordinate $z_g$ of the gravity center $P_g$ of the optical element 110, and an ordinate axis to a value of $(Z_{b0}-0.6W_b)$. FIG. 6 is a graph showing a relationship between a position of the gravity center $P_g$ of the optical element 110 and a joint position between the optical element 110 and retaining member 120 in the retainer 100.

Referring to FIG. 6, it is understood that an approximate linearity exists between the coordinate $z_g$ of the gravity center $P_g$ of the optical element 110 and $(Z_{b0}-0.6W_b)$ and, when a straight line that meets Equation 1 below is drawn in FIG. 6, each data is aligned with the straight line.

$$Z_{b0}0.6W_b=Z_g+1.2 \quad (1)$$

In other words, it is understood that when the joint member 130 is arranged so as to meet Equation 1, the optical element 110 can maintain variance of the 3θ deformations to be approximately zero even when the ambient temperature varies.

Thus, when the optical element 110 is jointed so that a coordinate $z_g$ of a gravity center $P_g$ of the optical element 110, a z coordinate $z_b$ of the joint position and the joint width $w_b$ meets Equation 1, the retainer 100 can reduce variance of the 3θ deformation of the optical element 110 and consequently changes of the trigonometric component of the wave front aberration, and maintain the optical performance of the optical element 110 to be less deteriorated, even when the ambient temperature varies.

When the retainer 100 of the instant embodiment is applied to an optical apparatus that includes plural optical elements, the optical apparatus can maintain its optical performance to be less deteriorated even when the temperature varies.

The joint position $z_b$ that meets an equal sign in the above Equation 1 is uniquely determined when the optical element 110 determines its shape size and joint width $w_b$, but the optical performance becomes less deteriorated as the temperature of the optical element varies if a joint position is set close to the joint position $z_b$ that meets the Equation 1. It is actually easy to maintain to be within about 1 mm a positional precision or a difference between both sides in Equation 1, as in Equation 2 below:

$$|(z_b-0.6w_b)-(z_g+1.2)|\leq 1 \quad (2)$$

While the instant embodiment assumes that the optical element 110 is a mirror, similar effects can be obtained for other optical elements, such as a lens, when only aberrational influence that results from deformations of a surface at a side of an anti-gravity direction is considered.

Figure 7:
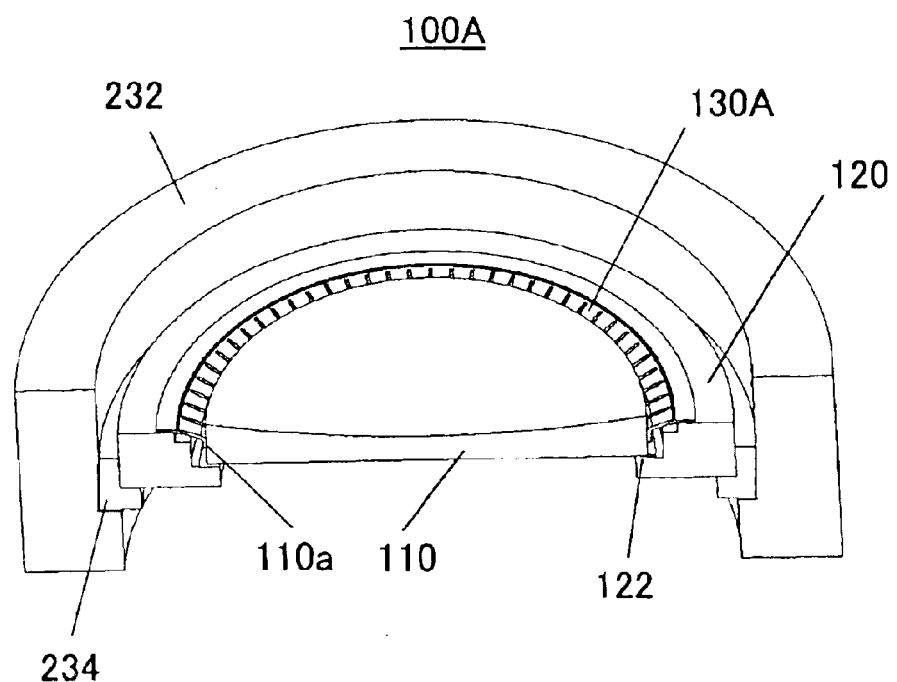
FIG. 7 is a schematic perspective view of a variation of the retainer shown in FIG. 1.

Referring now to FIG. 7, a description will be given of a retainer 100A as a variation of the retainer 100. FIG. 7 is a schematic sectional view of the retainer 100A. Those elements in FIG. 7, which are the same as corresponding elements in FIG. 1, are designated by the same reference numerals, and a description thereof will be omitted.

Referring to FIG. 7, the retainer 100A is similar to the retainer 100, but is different from the retainer 100 in that it replaces the adhesive with a comb-shaped spring 130A.

Figure 8:
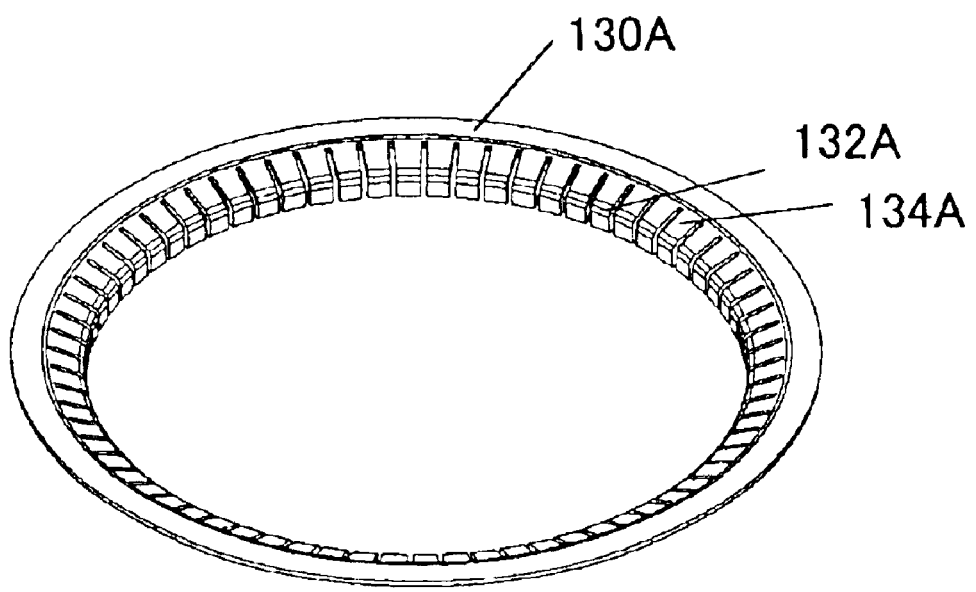
FIG. 8 is a schematic structure of a comb-shaped spring shown in FIG. 7.

The comb-shaped spring 130A has an annular shape around the center axis of the optical element 110, as shown in FIG. 8, and has a comb-shaped connection part 134A having plural radial perforation grooves 132A in it's inner surface. When the comb-shaped spring 130A bends a portion between the adjacent perforation grooves 132A in the connection part 134A, each portion serves as a flat spring. Here, FIG. 8 is a schematic structure of the comb-shaped spring.

The comb-shaped spring 130A is integrally attached to the optical element 110 so that the comb-shaped connection part 134A contacts the outer peripheral 110a of the optical element 110 and a spring force forces the optical element 110 towards the center via the outer peripheral 110a. A spring force of the comb-shaped connection part 134A enables the optical element 110 to be integrally held by the retaining member 120.

Similar to the retainer 100, as the ambient temperature varies, the retainer 100A provides, as a compulsory displacement via the comb-shaped spring 130A, the outer peripheral 110a of the optical element 110 with a difference in expansion and contraction amount that results from a difference in coefficient of linear expansion between the optical element 110 and the retaining member 120.

Therefore, effects similar to those for the retainer 100 can be obtained, when a cylindrical coordinate system (r, θ, z) similar to that shown in FIG. 3 is set, and when a coordinate $z_g$ of a gravity center $P_g$ of the optical element 110, a z coordinate $z_b$ of a center position of a width in the z-axis direction, by which the comb-shaped spring 130A contacts the optical element 110, and the contact $w_b$ in the z-axis direction are configured to meet Equation 2.

Figure 9:
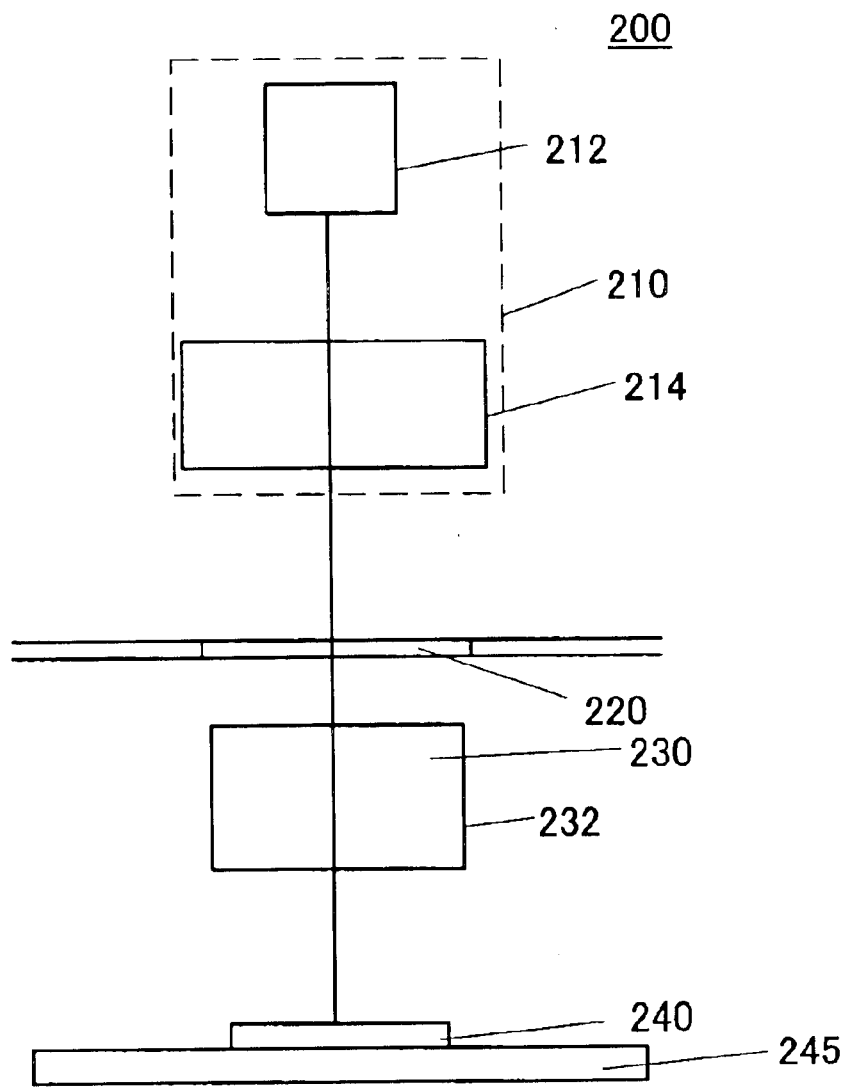
FIG. 9 is a schematic block diagram of an exposure apparatus of one aspect according to the present invention.

Referring now to FIG. 9, a description will be given of the projection optical system 230 to which the inventive retainer 100 or 100A is applied and the exposure apparatus 200 having the same. Here, FIG. 9 is a schematic block diagram of the illustrative exposure apparatus 200 of the instant embodiment. The exposure apparatus 200 includes, as shown in FIG. 9, an illumination apparatus 210 for illuminating a mask 220 which forms a circuit pattern, a projection optical system 230 that projects diffracted light created from the illuminated mask pattern onto a plate 240, and a stage 245 for supporting the plate 240.

The exposure apparatus 200 is a projection exposure apparatus that exposes onto the plate 240 a circuit pattern created on the mask 220, e.g., in a step-and-repeat or a step-and-scan manner. Such an exposure apparatus is suitable for a sub-micron or quarter-micron lithography process, and this embodiment exemplarily describes a step-and-scan exposure apparatus (which is also called "a scanner"). "The step-and-scan manner", as used herein, is an exposure method that exposes a mask pattern onto a wafer by continuously scanning the wafer relative to the mask, and by moving, after a shot of exposure, the wafer stepwise to the next exposure area to be shot. "The step-and-repeat manner" is another mode of exposure method that moves a wafer stepwise to an exposure area for the next shot every shot of cell projection onto the wafer.

The illumination apparatus 210 illuminates the mask 220 which forms a circuit pattern to be transferred, and includes a light source unit 212 and an illumination optical system 214.

The light source unit 212 uses as a light source, for example, as ArF excimer laser with a wavelength of approximately 193 nm, a KrF excimer laser with a wavelength of approximately 248 nm, and $F_2$ excimer laser with a wavelength of approximately 153 nm, but the a type of laser is not limited to excimer laser and a YAG laser may be, for example. Similarly, the number of laser units is not limited. $F_2$ laser with a wavelength of about 157 nm and an extreme ultraviolet ("EUV") light source with a wavelength between about 10 nm and about 20 nm are also applicable. For example, two independently acting solid lasers would cause no coherence between these solid lasers and significantly reduces speckles resulting from the coherence. An optical system for reducing speckles may swing linearly or rotationally. When the light source unit 212 uses laser, it is desirable to employ a beam shaping optical system that shapes a parallel beam from a laser source to a desired beam shape, and an incoherently turning optical system that turns a coherent laser beam into an incoherent one. A light source applicable to the light source unit 212 is not limited to a laser, and may use one or more lamps such as a mercury lamp and a xenon lamp.

The illumination optical system 214 is an optical system that illuminates the mask 220, and includes a lens, a mirror, a light integrator, a stop, and the like, for example, a condenser lens, a fly-eye lens, an aperture stop, a condenser lens, a slit, and an image-forming optical system in this order. The illumination optical system 214 can use any light whether it is axial or non-axial light. The light integrator may include a fly-eye lens or an integrator formed by stacking two sets of cylindrical lens array plates (or lenticular lenses), and be replaced with an optical rod or a diffractive element. The inventive retainer 100 or 100A may be used to hold the optical element, such as a lens in the illumination optical system 214.

The mask 220 is made, for example, of quartz, forms a circuit pattern (or an image) to be transferred, and is supported and driven by a mask stage (not shown). Diffracted light emitted from the mask 220 passes the projection optical system 230, thus and then is projected onto the plate 240. The mask 220 and the plate 240 are located in an optically conjugate relationship. Since the exposure apparatus 200 of this embodiment is a scanner, the mask 220 and the plate 240 are scanned at the speed ratio of the reduction ratio of the projection optical system 230, thus transferring the pattern on the mask 220 to the plate 240. If it is a step-and-repeat exposure apparatus (referred to as a "stepper"), the mask 220 and the plate 240 stand still in exposing the mask pattern.

The projection optical system 230 may use an optical system solely including a plurality of lens elements, an optical system including a plurality of lens elements and at least one concave mirror (a catadioptric optical system), an optical system including a plurality of lens elements and at least one diffractive optical element such as a kinoform, and a full mirror type optical system, and so on. Any necessary correction of the chromatic aberration may use a plurality of lens units made from glass materials having different dispersion values (Abbe values), or arrange a diffractive optical element such that it disperses in a direction opposite to that of the lens unit.

The inventive retainer 100 or 100A may be used to hold the optical element, such as a lens in the projection optical system 230. The retainer 100 or 100A is connected to the lens barrel 232 in the projection optical system 230 through a spring member 234 for absorbing radial deformations, as shown in FIGS. 1 and 7, and may absorb radial deformations. This structure may prevent the retaining member 120 from decentering due to a relative displacement between the lens barrel 232 and the retaining member 120, which relative displacement results from different coefficients of linear expansion between them, when the temperature environment changes, for example, in carrying the apparatus.

Due to the above structured retainers 100 and 100A, the projection optical system 230 may achieve desired optical performance by reducing the aberration that results from the deformation and positional offset of the optical element 110 which otherwise deteriorates imaging performance.

The plate 240 is an object to be exposed such as a wafer and a liquid crystal plate, and photoresist is applied onto it. A photoresist application step includes a pretreatment, an adhesion accelerator application treatment, a photoresist application treatment, and a pre-bake treatment. The pretreatment includes cleaning, drying, etc. The adhesion accelerator application treatment is a surface reforming process so as to enhance the adhesion between the photo-resist and a base (i.e., a process to increase the hydrophobicity by applying a surface active agent), through a coat or vaporous process using an organic film such as HMDS (Hexamethyldisilazane). The pre-bake treatment is a baking (or burning) step, softer than that after development, which removes the solvent.

The stage 245 supports the plate 240. The stage 240 may use any structure known in the art, and a detailed description of its structure and operation is omitted. The stage 245 may use, for example, a linear motor to move the plate 240 in XY directions. The mask 220 and plate 240 are, for example, scanned synchronously, and the positions of the stage 245 and a mask stage (not shown) are monitored, for example, by a laser interferometer and the like, so that both are driven at a constant speed ratio. The stage 245 is installed on a stage stool supported on the floor and the like, for example, via a damper, and the mask stage and the projection optical system 230 are installed on a lens barrel stool (not shown) supported, for example, via a damper to the base frame placed on the floor.

In exposure, light emitted from the light source 212, e.g., Koehler-illuminates the mask 220 via the illumination optical system 214. Light that passes through the mask 220 and reflects the mask pattern is imaged onto the plate 240 via the projection optical system 230. The projection optical system 230 and/or the illumination optical system 214 used for the exposure apparatus 200 include an optical element held by the inventive retainer 100 or 100A, and reduce the deformation and the aberration resulting from the positional offset of the optical element, thus being able to provide highquality devices (such as semiconductor devices, LCD devices, photographing devices (such as CCDs, etc.), thin film magnetic heads, and the like).

Figure 10:
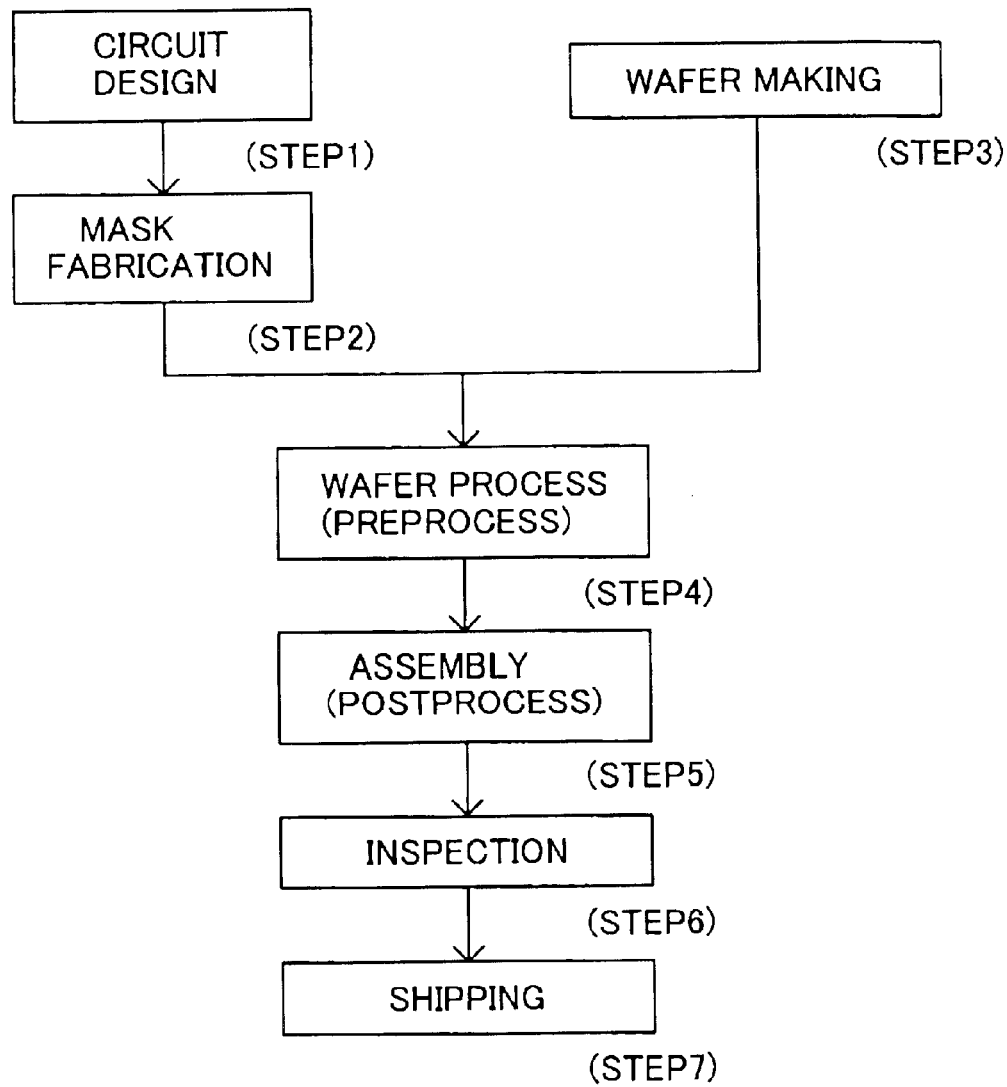
FIG. 10 is a flowchart for explaining a method for fabricating devices (semiconductor chips such as ICs, LSIs, and the like, LCDs, CCDs, etc.).
Figure 11:
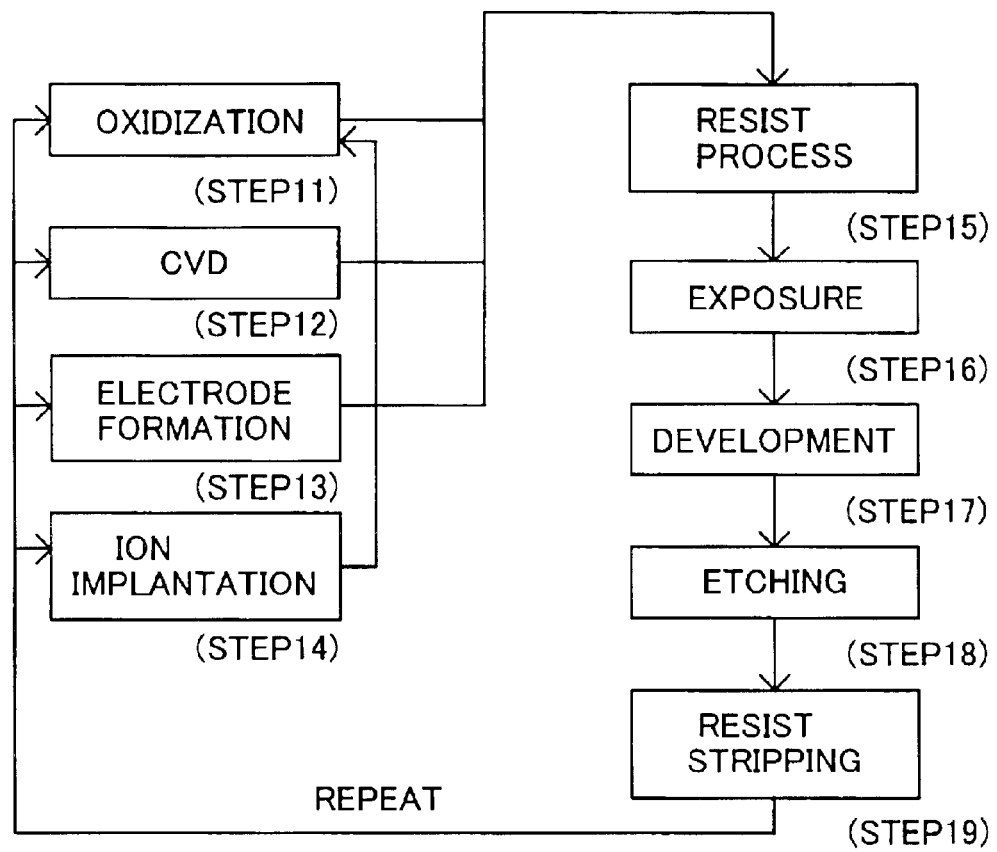
FIG. 11 is a detailed flowchart for Step 4 of wafer process shown in FIG. 10.
Figure 12:
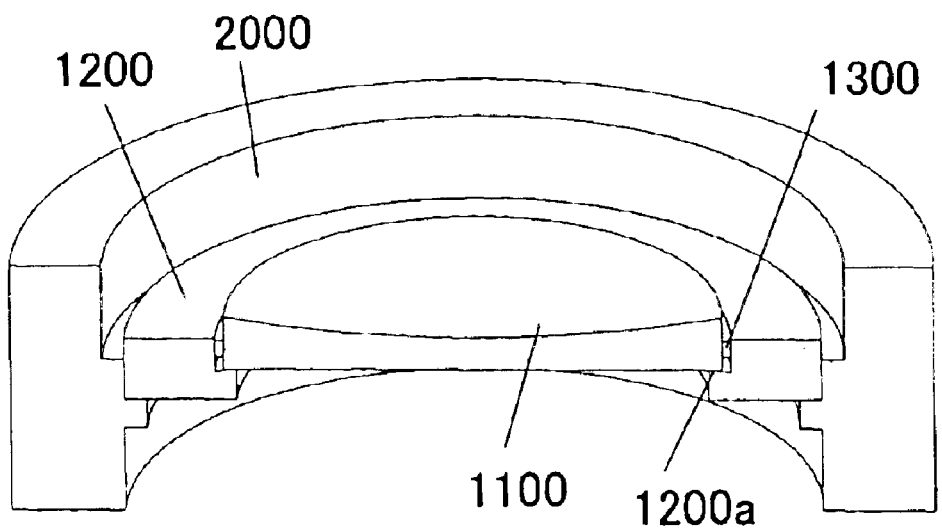
FIG. 12 is a schematic sectional view of a conventional retainer for an optical element.
Figure 13:
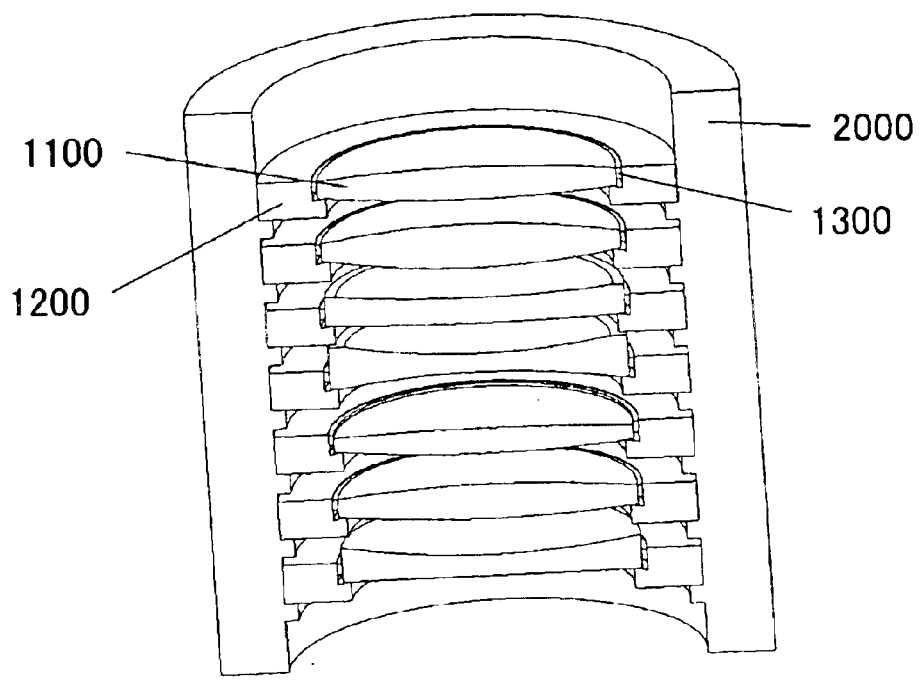
FIG. 13 is a schematic sectional view of an optical system that includes an optical element held by the conventional retainer.
Figure 14:
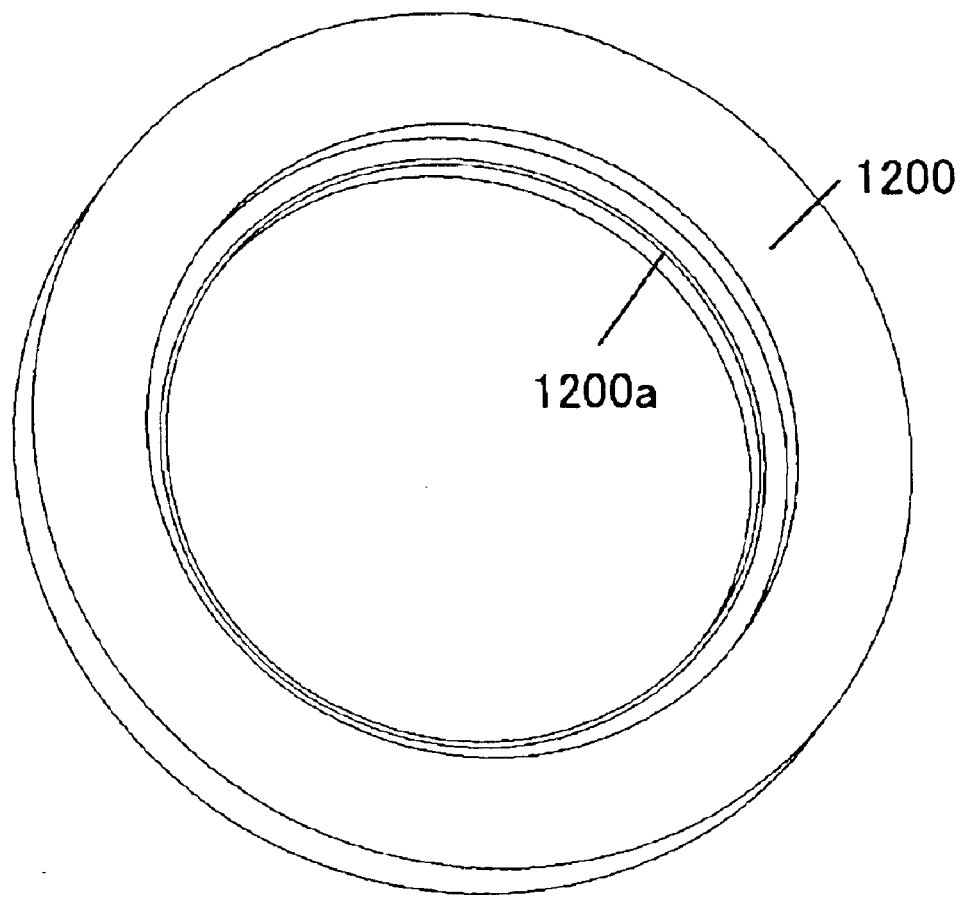
FIG. 14 is a schematic structure of a retaining element in the conventional retainer.
Figure 15:
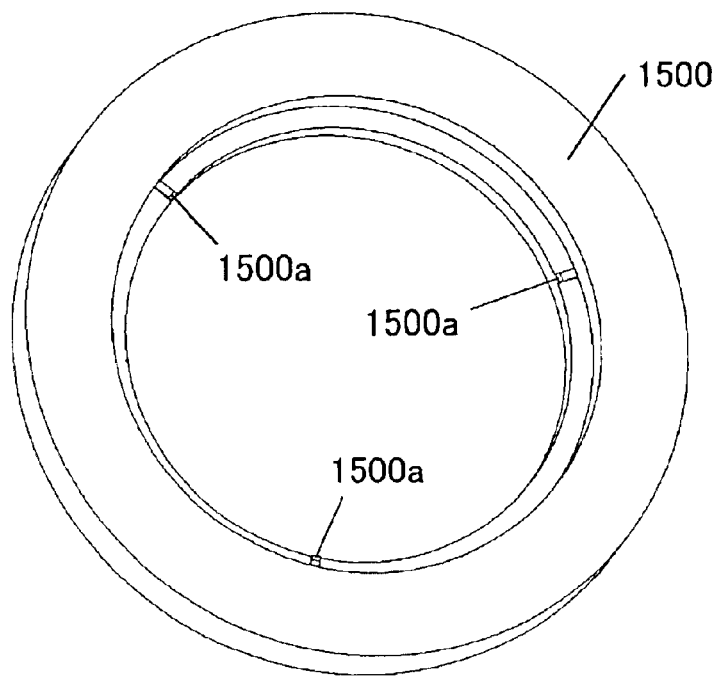
FIG. 15 is a schematic structure of a retaining element in another conventional retainer.

Referring now to FIGS. 10 and 11, a description will be given of an embodiment of a device fabrication method using the above mentioned exposure apparatus 200. FIG. 10 is a flowchart for explaining how to fabricate devices (i.e., semiconductor chips such as IC and LSI, LCDs, CCDs, and the like). Here, a description will be given of the fabrication of a semiconductor chip as an example. Step 1 (circuit design) designs a semiconductor device circuit. Step 2 (mask fabrication) forms a mask having a designed circuit pattern. Step 3 (wafer making) manufactures a wafer using materials such as silicon. Step 4 (wafer process), which is also referred to as a pretreatment, forms actual circuitry on the wafer through lithography using the mask and wafer. Step 5 (assembly), which is also referred to as a post-treatment, forms into a semiconductor chip the wafer formed in Step 4 and includes an assembly step (e.g., dicing, bonding), a packaging step (chip sealing), and the like. Step 6 (inspection) performs various tests for the semiconductor device made in Step 5, such as a validity test and a durability test. Through these steps, a semiconductor device is finished and shipped (Step 7).

FIG. 11 is a detailed flowchart of the wafer process in Step 4. Step 11 (oxidation) oxidizes the wafer's surface. Step 12 (CVD) forms an insulating film on the wafer's surface. Step 13 (electrode formation) forms electrodes on the wafer by vapor disposition and the like. Step 14 (ion implantation) implants ion into the wafer. Step 15 (resist process) applies a photosensitive material onto the wafer. Step 16 (exposure) uses the exposure apparatus 200 to expose a circuit pattern on the mask onto the wafer. Step 17 (development) develops the exposed wafer. Step 18 (etching) etches parts other than a developed resist image. Step 19 (resist stripping) removes disused resist after etching. These steps are repeated, and multi-layer circuit patterns are formed on the wafer. Use of the fabrication method in this embodiment helps fabricate higher-quality devices than conventional. Thus, the device fabrication method using the exposure apparatus 200, and resultant devices constitute one aspect of the present invention.

Further, the present invention is not limited to these preferred embodiments and various variations and modifications may be made without departing from the scope of the present invention. For example, the inventive retainer may be used to hold a mask and a wafer.

The inventive retainer provides a retainer that restrains changes of trigonometric components generated in an optical element when an ambient temperature changes, and prevents deteriorations of optical performance.

What is claimed is:

1. A retainer for holding an optical element, the optical element according a center axis of the optical element with a gravity direction, and having an approximately rotationally symmetrical shape, said retainer comprising:

a retaining member that includes three support parts arranged at approximately 120° intervals around the center axis, and holds the optical element via the support parts; and a joint member that joints the optical element with the retaining member, wherein $|(z_b - 0.6 w_b) - (z_g + 1.2)| \leq 1$ is met, where a Z coordinate system has an origin at an intersection between the center axis and a surface of the optical element, which surface faces a direction opposite to the gravity direction, and sets a Z axis to be positive in the direction opposite to the gravity direction of the center axis, $z_g$ is a coordinate of a gravity center of the optical element in the Z coordinate system, $z_b$ is a coordinate of a center position of a width of said joint member in the z axis direction by which said joint member contacts the optical element in the Z coordinate system, and $w_b$ is the width of said joint member in the z axis direction by which said joint member contacts the optical element.

2. A retainer according to claim 1, wherein the optical element is a mirror.

3. A retainer according to claim 1, wherein said joint member is an adhesive.

4. A retainer according to claim 1, wherein said joint member is a comb-shaped spring.

5. A retainer according to claim 1, wherein said retaining member has an annular shape around the center axis of the optical member.

6. A retainer according to claim 1, wherein said joint member joints said retaining member around an entire outer peripheral of the optical element.

7. An optical system comprising:

an optical element that accords a center axis of the optical element with a gravity direction, and has an approximately rotationally symmetrical shape, and a retainer for holding said optical element, wherein said retainer includes:

a retaining member that includes three support parts arranged at approximately 120° intervals around the center axis, and holds the optical element via the support parts; and a joint member that joints the optical element with the retaining member, wherein $|(z_b - 0.6 w_b) - (z_g + 1.2)| \leq 1$ is met, where a Z coordinate system has an origin at an intersection between the center axis and a surface of the optical element, which surface faces a direction opposite to the gravity direction, and sets a Z axis to be positive in the direction opposite to the gravity direction of the center axis, $z_g$ is a coordinate of a gravity center of the optical element in the Z coordinate system, $z_b$ is a coordinate of a center position of a width of said joint member in the z axis direction by which said joint member contacts the optical element in the Z coordinate system, and $w_b$ is the width of said joint member in the z axis direction by which said joint member contacts the optical element.

8. An optical apparatus comprising:

plural optical elements; and a retainer for holding at least one of said optical elements, which one accords a center axis of the optical element with a gravity direction, and has an approximately rotationally symmetrical shape, wherein said retainer includes:

a retaining member that includes three support parts arranged at approximately 120° intervals around the center axis, and holds the optical element via the support parts; and a joint member that joints the optical element with the retaining member, wherein $|(z_b - 0.6 w_b) - (z_g + 1.2)| \leq 1$ is met, where a Z coordinate system has an origin at an intersection between the center axis and a surface of the optical element, which surface faces a direction opposite to the gravity direction, and sets a Z axis to be positive in the direction opposite to the gravity direction of the center axis, $z_g$ is a coordinate of a gravity center of the optical element in the Z coordinate system, $z_b$ is a coordinate of a center position of a width of said joint member in the z axis direction by which said joint member contacts the optical element in the Z coordinate system, and $w_b$ is the width of said joint member in the z axis direction by which said joint member contacts the optical element.

9. An exposure apparatus comprising:

a retainer for holding an optical element, the optical element according a center axis of the optical element with a gravity direction, and having an approximately rotationally symmetrical shape, said retainer including a retaining member that includes three support parts arranged at approximately 120° intervals around the center axis, and holds the optical element via the support parts, and a joint member that joints the optical element with the retaining member, wherein $|(z_b-0.6w_b)-(z_g+1.2)| \leq 1$ is met, where a Z coordinate system has an origin at an intersection between the center axis and a surface of the optical element, which surface faces a direction opposite to the gravity direction, and sets a Z axis to be positive in the direction opposite to the gravity direction of the center axis, $z_g$ is a coordinate of a gravity center of the optical element in the Z coordinate system, $z_b$ is a coordinate of a center position of a width of said joint member in the z axis direction by which said joint member contacts the optical element in the Z coordinate system, and $w_b$ is the width of said joint member in the z axis direction by which said joint member contacts the optical element; and an optical system for exposing a pattern formed on a mask or reticle onto an object via the optical element held by the retainer.

10. A device fabrication method comprising the steps of:

exposing a pattern on a mask, onto an object by using an exposure apparatus; and developing the object that has been exposed, wherein said exposure apparatus includes:

a retainer for holding an optical element, the optical element according a center axis of the optical element with a gravity direction, and having an approximately rotationally symmetrical shape, said retainer including a retaining member that includes three support parts arranged at approximately 120° intervals around a center axis of the optical element, and holds the optical element via the support parts, and a joint member that joints the optical element with the retaining member, wherein $|(z_b-0.6w_b)-(z_g+1.2)| \leq 1$ is met, where a Z coordinate system has an origin at an intersection between the center axis and a surface of the optical element, which surface faces a direction opposite to the gravity direction, and sets a Z axis to be positive in the direction opposite to the gravity direction of the center axis, $z_g$ is a coordinate of a gravity center of the optical element in the Z coordinate system, $z_b$ is a coordinate of a center position of a width of said joint member in the z axis direction by which said joint member contacts the optical element in the Z coordinate system, and $w_b$ is the width of said joint member in the z axis direction by which said joint member contacts the optical element; and an optical system for exposing a pattern formed on a mask or reticle onto an object via the optical element held by the retainer.

* * * * *